Aug. 16, 1966  L. GERARDIN ET AL  3,267,467
APPARATUS FOR ELIMINATING SPURIOUS ECHOES IN RADARS
Filed Jan. 16, 1963
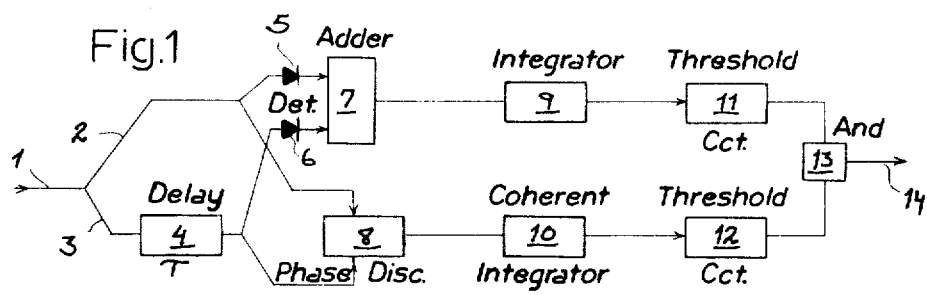
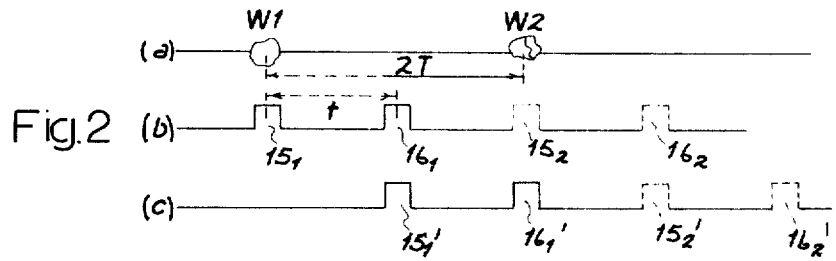
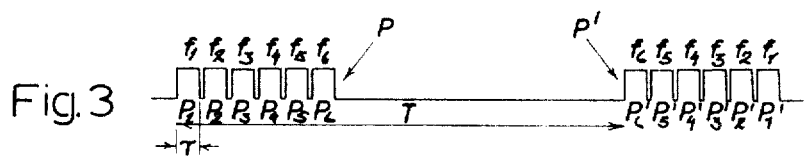
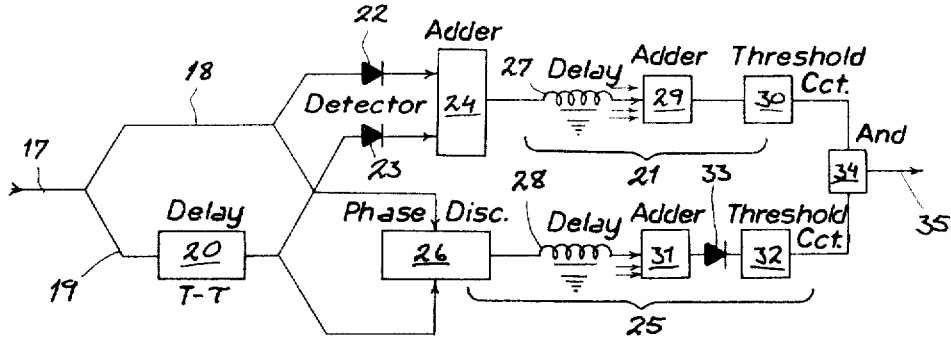
Lucien Gerardin
Jack G. Mc Queen
INVENTORS.
BY
Karl G. Ross
Attorney

United States Patent Office 3,267,467
Patented August 16, 1966

---

3,267,467
APPARATUS FOR ELIMINATING SPURIOUS ECHOES IN RADARS
Lucien Gerardin, Le Raincy, France, and Jack G. McQueen, Cheadle Hume, Cheshire, England, assignors to Compagnie Francaise Thomson-Houston, Paris, France, a corporation of France
Filed Jan. 16, 1963, Ser. No. 251,961
Claims priority, application France, Jan. 23, 1962, 885,586, Patent 1,344,203
4 Claims. (Cl. 343—7.7)

The present invention relates to an apparatus for eliminating spurious echoes in a radar system. It is more specially concerned with the cancellation of fixed-target echoes from drifting objects such as clouds or chaff, the latter being commonly used for the purpose of jamming the operation of a radar installation.

This problem has been already studied and the several solutions which have been proposed for the cancellation of the permanent echoes produced by metallized-foil ribbons, involving the use of a radar whose frequency upon transmission is varied at random from one repetition period to another, require the transmission of two pulses within a given repetition period. This requirement is equivalent to the duplication of the transmitted pulse but the choice of the interval between these pulses becomes extremely important. It has been shown that this interval should be relatively small.

A system of the type referred to is, however, only able to cancel parasitical echoes produced by chaff in the case when the constituents thereof remain discrete and do not constitute a continuum.

Some shortcomings arise, moreover, when an improved performance of the cancellation device is desired and, in particular, these shortcomings lead to the cancellation of echoes of targets when the metallic ribbons are sending back extensive echoes within the same resolution cell (i.e., the zone within which echoes can be produced by a single outgoing radar beam); they lead also to the appearance of false echoes produced by the metal-foil ribbons and spaced apart by twice the chosen interval between the two pulses which are transmitted during a repetition period.

The present invention has for object to remove the described shortcomings and to provide an arrangement affording more effective protection against interference effects of metal-foil ribbons.

A feature of the invention is the transmission in each period of two pulses which are separated by a predetermined interval which is varied from one period to another.

According to another feature of the invention, each transmitted pulse is subdivided into a certain number of constitution pulses, each of them having a different frequency varying according to a predetermined order.

In accordance with still another feature of the invention, the order of transmission of the frequency values within one of the two composite pulses is the inverse of that in which they are emitted in the other composite pulse; the intervals between the corresponding constitutive pulses are thus all different from one another.

Other features and additional advantages will be more readily understood by those skilled in the art from a detailed consideration of the following specification taken together with the accompanying drawing wherein:

FIG. 1 is a block diagram of a receiver usable for minimizing the interference effects of chaff;

FIG. 2 is a diagram showing how interference can be produced by two spurious echoes of given spacing;

FIG. 3 is a representation of the pulses transmitted in accordance with the invention; and FIG. 4 is a block diagram of an improved receiver according to the invention.

FIG. 1 represents a block diagram of a radar receiver which, within specified limits, ensures the cancellation of spurious echoes. Such a receiver comprises at least two channels, a direct one and a delayed one, for allowing a coincidence test to be carried out among the received signals on the one hand within a repetition period and on the other hand over a succession of repetition periods, this test being made at an intermediate frequency. There is furthermore also provided a so-called amplitude channel for discrimination between the target and chaff echoes and the noise echoes and a so-called phase channel for discrimination between the target and noise echoes and the chaff echoes. The amplitude channel gives a "presence" indication and the second channel gives a "speed" indication, both indications together resulting in a so-called target indication. The intermediate-frequency signals are applied to the input 1 and sent through two separate channels 2 and 3, channel 2 being direct and channel 3 comprising a cell 4 imparting to the signals a fixed delay T. The direct and delayed signals are added in an adder circuit 7, after having been detected by means of rectifiers 5 and 6, and after an integration in a circuit 9 they feed a threshold device 11 the output of which is connected to an "AND" circuit 13. In the second channel, called "phase channel," the direct and delayed signals are applied to a phase discriminator 8 feeding a coherent integrator 10. The signals then pass through a threshold circuit 12, the output of which is connected to the "AND" circuit 13 already mentioned. The two threshold circuits 11 and 12 allow to obtain what is called "presence" and "echo speed" indications which, when applied to the logical adder circuit "AND" 13, give the final message, i.e., the target echoes. Since the delay T introduced by circuit 4 equals the spacing of the two pulses consecutively transmitted within a repetition period or operating cycle of the system, the presence of a well-defined object (target or chaff) within range will give rise to two simultaneous pulses at the inputs 5, 6 of adder 7; thus, an echo due to the first outgoing pulse reaches the adder 7 via rectifier 6 at the same time that an echo from the same object due to the second outgoing pulse is applied to the adder through rectifier 5. If the object is stationary or nearly so, as is true in the case of chaff, the two pulses concurrently applied without rectification to the inputs of phase discriminator 8 will have their I.-F. components substantially in phase so that the output of the discriminator will be insignificant. In the case of a moving target, however, the circuits 7 and 8 will both have significant outputs which, when integrated in circuits 9 and 10, will surpass the threshold of circuits 11 and 12, respectively, to produce concurrent signals for the actuation of the AND circuit 13.

Still, the receiver of FIG. 1 allows only the cancellation of spurious echoes, produced by chaff, when they remain discrete and do not constitute a continuum; in the latter case target echoes are cancelled if a given amount of chaff is located in the same resolution cell. This receiver also gives rise to false signals generated by chaff echoes which are spaced apart by twice the chosen interval T for the transmitted pulses. This has been illustrated in FIG. 2 where graph (a) shows two pulses W1 and W2 representing the echoes of a single outgoing pulse as reflected by chaff at two separate locations so spaced apart that the two echo pulses are separated by an interval 2T. The corresponding signal pulses, as they appear at the inputs of circuits 7 and 8, have been shown at $15_1$ and $15_2$ in graph (b), representing the direct channel 2, and at $15_1'$ and $15_2'$ in graph (c), representing the delayed channel 3. These signal pulses are caused by the first one of the two paired pulses consecutively transmitted during a repetition period; the corresponding signal pulses due to the second transmitted pulse have been analogously designated $16_1$, $16_2$ for the direct channel and $16_1'$, $16_2'$ for the delayed channel.

The coincidence of pulses $16_1$ and $15_1'$ does not produce an output in phase discriminator 8 since the I.-F. components of these pulses are in phase with each other. The concurrent appearance of pulses $15_2$ and $16_1'$ will, however, generate such an output because they represent echoes which have traveled over different distances so that their I.-F. components usually will have a phase difference between them, their coincidence therefore simulating the existence of a moving target and giving rise to a spurious output on line 14 indicating such target.

According to the invention, the above-described receiver has been modified in order to reduce the risk of error in the determination of the echoes.

The mode of operation of our improved system involves the use in each repetition period of two pulses separated by an interval T which is different from one period to another. With transmission of single pulses, as described above, detection of a moving target is impeded by the effect of a superimposed chaff echo, upon the coherent output of discriminator 8 in the phase channel 10, 12 whereby the apparent speed could be reduced by as much as one-half has an average echoing area equaling that of the target. It therefore behooves to reduce the size of a resolution cell, which is known to be proportional to the pulse width, in order to minimize the effective chaff area. This reduction is made, in accordance with the invention, by a splitting of each of the two paired pulses into a plurality of component pulses of different, discrete frequencies. This shortens the coincidence interval of the direct and delayed pulse signals in the phase channel and therefore renders the coherent output thereof less susceptible to interference from chaff echoes.

In the course of each repetition period, two pulses separated by an interval T are transmitted and each of these pulses is subdivided into a given number of constitutive pulses each having a duration $\tau$. These component pulses appear in the reverse order of their respective frequencies in the two transmitted composite pulses. FIG. 3 shows the distribution of these constitutive pulses and the intervals between corresponding constitutive pulses in the transmitted composite pulses P, P' are disclosed in the following table:

| Component pulses: | Intervals |
| --- | --- |
| $P-P_1'$ | $T+5\tau$ |
| $P_2-P_2'$ | $T+3\tau$ |
| $P_3-P_3'$ | $T+\tau$ |
| $P_4-P_4'$ | $T-\tau$ |
| $P_5-P_5'$ | $T-3\tau$ |
| $P_6-P_6'$ | $T-5\tau$ |

FIG. 3 also shows that, as noted above, the constitutive pulses $P_1-P_6$ of composite pulse P and the constitutive pulses $P_1'-P_6'$ of composite pulse P' have frequencies varying inversely in the two composite pulses, i.e., from $f_1$ to $f_6$ in pulse P and from $f_6$ to $f_1$ in pulse P'. A radar receiver according to the invention, adapted to evaluate echo signals due to the pulses of FIG. 3, is shown in FIG. 4.

The signals applied as coherent waves to the input of a common I.-F. channel 17 are transmitted through a direct and a delayed channel 18 and 19 respectively, this latter comprising a delay network 20 which imparts to the signals a delay of duration $T-\tau$. The signals transmitted through the two channels are added and sent to an amplitude channel 21 through rectifiers 22 and 23 and an adder circuit 24, and to a phase channel 25 through a phase discriminator 26 determining the phase difference between the direct and the delayed signals.

The unipolar video-frequency pulses in the output of adder 24 are transimtted in channel 21 to another adder 29 via a delay network 27 consisting of several parallel paths only one of which has been shown in detail; the video pulses accumulated in adder 29 are fed to one input of an AND circuit 34 by way of a threshold circuit 30. A similar delay network 28 applies the alternating output of phase discriminator 26 to an adder 31 in channel 25 and thence, after conversion of this accumulated output into unidirectional vide-frequency pulses by means of a rectifier 33, to the other input of AND circuit 34 by way of a threshold circuit 32. The purpose of the delay networks 27 and 28 is to equalize phase differences and to insure proper coincidence of the two video pulses due to target echoes at the inputs of AND circuit 34 so as to produce the desired target indication on an output lead 35, as described with reference to AND circuit 13 of FIG. 1.

It has been assumed above that the delay introduced by circuit 20 is equal to the spacing of the two constitutive pulses $P_4$ and $P_4'$, i.e., $T-\tau$ according to the foregoing table. Thus, only the pulses $P_4$ and $P_4'$ will generate a significant output in phase discriminator 26 upon the detection of a moving target, any other two similarly spaced constitutive pulses (e.g., $P_3$ and $P_5'$) being ineffectual since their frequencies do not match. Since, however, the pulse spacing T has been described as varying from one repetition period to the other, a different pair of corresponding constitutive pulses (say, $P_3$ and $P_3'$) will become effective during the next cycle, and so on. Thus, the identity and therefore the frequency of the effective pulse pair changes from cycle to cycle, along with the time position of such pulse pair in the cycle.

Our invention is not limited to the specific arrangement described and illustrated or to the particular pulse distribution set forth hereinabove. It is also possible to utilize several reception channels with different pulse distributions without departing from the scope of the invention as defined in the appended claims.

What we claim is:

1. In a system for the detection of moving targets, comprising a radar transmitter and a receiver for echoes of transmitted pulses, the improvement whereby said transmitter has means for generating a pair of consecutive composite pulses during each of a succession of operating cycles, said composite pulses being separated by an interval which varies from cycle to cycle, each composite pulse consisting of a predetermined number of constitutive pulses of different frequencies appearing in different relatively inverse order in the paired pulses of one cycle, said receiver including a first and a second input channel for intermediate-frequency signal pulses due to echoes of said composite pulses radiated by said transmitter, delay means in said second channel adapted to retard the signal pulses thereof by a delay close to the duration of said interval, first circuit means connected to said channels for detecting the envelopes of coinciding undelayed and delayed signal pulses thereof and additively combining the pulses thus detected, whereby a first signal indicative of the presence of a localized object is generated, second circuit means connected to said channels for comparing the phases of the alternating-current intermediate-frequency components of coinciding constitutive pulses of like frequency of said signal pulses and generating a second signal indicative of the speed of such localized object in response to a phase difference between said components, and output means jointly triggerable by said first and second signals for producing a moving-target indication upon coincidence of said first and second signals.

2. The improvement defined in claim 1 wherein said receiver further includes rectifier means connected between said second circuit means and said output means.

3. The improvement defined in claim 1 wherein said receiver further includes equalizing delay means in the outputs of said first and second circuit means, and accumulator means connected in series with threshold means between said equalizing delay means and said output means.

4. In a system for the detection of moving targets, comprising a radar transmitter and a receiver for echoes of transmitted pulses, the improvement whereby said transmitter has means for generating a pair of consecutive composite pulses during each of a succession of operating cycles, said composite pulses being separated by an interval which varies from cycle to cycle, each composite pulse consisting of a predetermined number of constitutive pulses of different frequencies appearing in relatively inverse order in the paired pulses of one cycle, said receiver including a first and a second input channel for intermediate-frequency signal pulses due to echoes of said composite pulses radiated by said transmitter, delay means in said second channel adapted to retard the signal pulses thereof by a delay close to the duration of said interval, first circuit means connected to said channels for detecting the envelopes of coinciding undelayed and delayed signal pulses thereof and additively combining the pulses thus detected, whereby a first signal indicative of the pressure of a localized object is generated, second circuit means connected to said channels for comparing the phases of the intermediate-frequency components of coinciding constitutive pulses of like frequency of said signal pulses and generating a second signal indicative of the speed of such localized object in response to a phase difference between said components, and output means jointly triggerable by said first and second signals for producing a moving-target indication upon coincidence of said first and second signals.

References Cited by the Examiner
UNITED STATES PATENTS

| | | | |
|---|---|---|---|
| 2,840,808 | 6/1958 | Woodward | 343—7.7 |
| 2,842,761 | 7/1958 | Downs | 343—7.7 |

CHESTER L. JUSTUS, *Primary Examiner.*

R. D. BENNETT, *Assistant Examiner.*